Feb. 21, 1933. E. C. FURRER Re. 18,746

DEVICE FOR INDICATING MARKET QUOTATIONS

Original Filed Oct. 20, 1924 3 Sheets-Sheet 1

INVENTOR
Emery C. Furrer
BY Ward, Crosby & Neal
ATTORNEYS

Feb. 21, 1933. E. C. FURRER Re. 18,746

DEVICE FOR INDICATING MARKET QUOTATIONS

Original Filed Oct. 20, 1924 3 Sheets-Sheet 2

INVENTOR
Emery C. Furrer
BY Ward, Crosby & Neal
ATTORNEYS

Feb. 21, 1933. E. C. FURRER Re. 18,746

DEVICE FOR INDICATING MARKET QUOTATIONS

Original Filed Oct. 20, 1924 3 Sheets-Sheet 3

INVENTOR
Emery C. Furrer
BY Ward, Crosby & Neal
ATTORNEYS

Reissued Feb. 21, 1933 Re. 18,746

UNITED STATES PATENT OFFICE

EMERY C. FURRER, OF CHICAGO, ILLINOIS, ASSIGNOR, BY MESNE ASSIGNMENTS, TO THE TELEREGISTER CORPORATION, OF NEW YORK, N. Y., A CORPORATION OF DELAWARE

DEVICE FOR INDICATING MARKET QUOTATIONS

Original No. 1,788,100, dated January 6, 1931, Serial No. 744,793, filed October 20, 1924. Application for reissue filed March 8, 1932. Serial No. 597,605.

My invention relates to improvements in devices for indicating market quotations, and it consists in the combinations, constructions, and arrangements herein described and claimed.

An object of my invention is to provide a device of the type described in which a moving tape is employed which is caused to move across a stationary display board, and upon which stock quotations, and notations pertaining to stocks are imprinted as the tape moves upon the face of the board.

A further object of my invention is to provide a device of the type described by means of which the broker and his clientele may observe at a glance the relative fluctuations in stock values of any predetermined denomination or specie without the necessity of handling a relatively long tape, bearing miscellaneous notations of various stocks side by side, and which easily becomes entangled so as to make it difficult for the observer to quickly ascertain the condition of the market as to some particular stock.

A further object of my invention is to provide a device of the type described which does away with the necessity of a blackboard and employment of men or boys to make notations thereon. With my improved device for indicating market quotations, all persons in the room in which the device is installed may observe the notations thereon just as quickly as communicated from the transmitting station at one time.

A further object of my invention is to provide a device of the type described in which particularly novel means is employed for imprinting the notations on the tape and for moving the tape as the printing is accomplished.

A further object of my invention is to provide a device of the type described that is extremely simple to operate and which does not necessitate the employment of a skilled operator.

A further object of my invention is to provide a device of the type described that is compact in form and which is thoroughly practical for the purpose intended.

Other objects and advantages will appear in the following specification, and the novel features of the invention will be particularly pointed out in the appended claims.

My invention is illustrated in the accompanying drawings forming part of this application, in which Figure 1 is a diagrammatic view showing the electrical circuits employed in the transmitting mechanism, and in diagrammatic form the essential elements of the transmitting apparatus;

In carrying out my invention I employ a transmitting apparatus having two distinct circuits which I shall refer to from time to time as the selector circuit and the type circuit. The mechanism in the electrical connections employed in the transmitting apparatus is fully disclosed in Fig. 1 and for the purpose of clearness and brevity in description, only the essential mechanical elements are shown.

Figure 1:
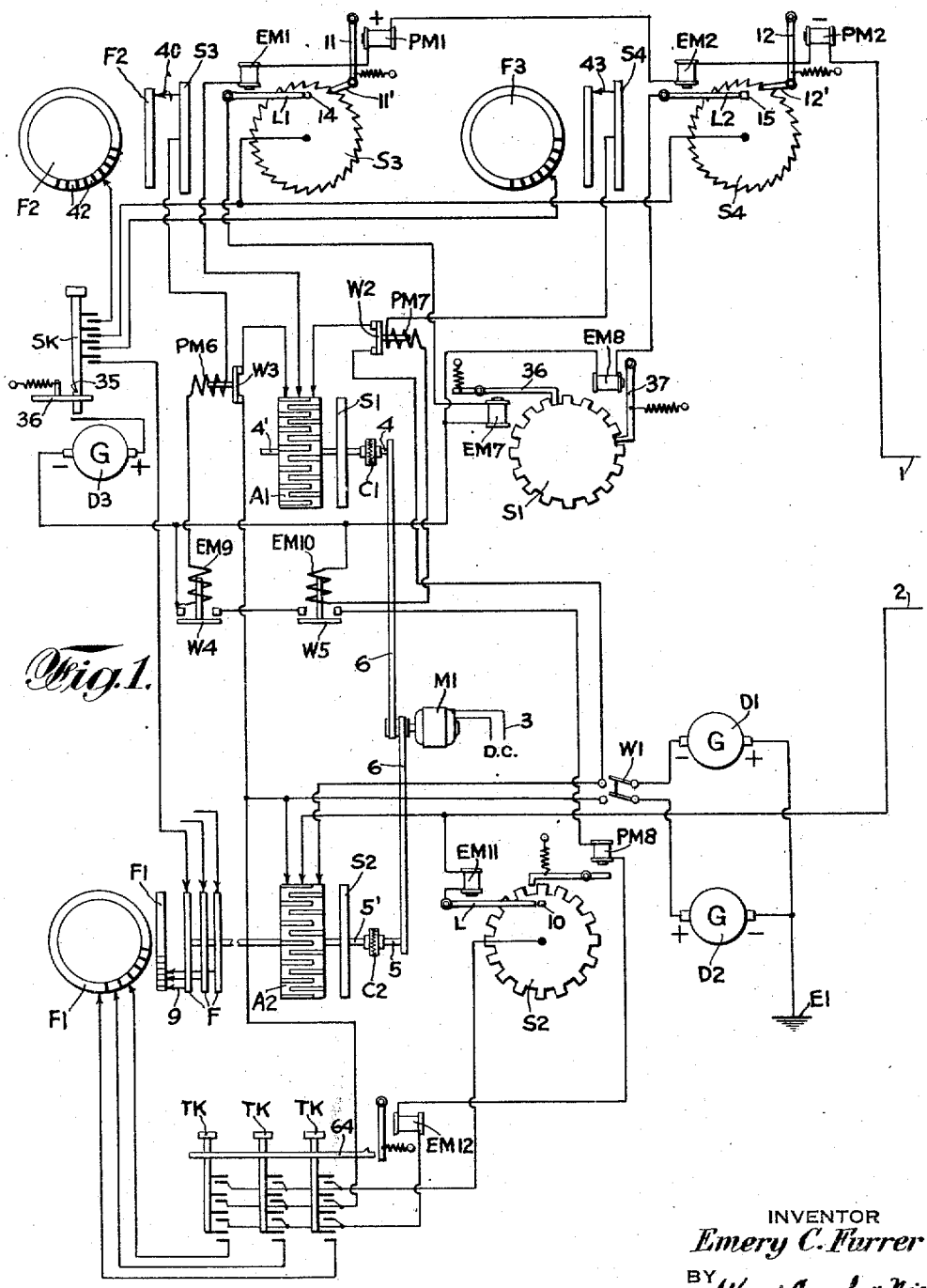

The transmitting station is located preferably in a central office, as near the stock market or exchange as possible, where an operator, having intimate knowledge of the activity in the market may immedately upon notice of changes in stock values and news of interest to the broker, actuate a keyboard, certain keys of which, for the purpose of illustration, are shown in Fig. 1, whereupon electrical impulses are set up, in conducting lines connected with suitable receiving mechanism for the purpose of actuating a moving tape in each of the several receiving stations, and for operating simultaneously printing mechanism for imprinting the message, quotations, and the like, upon the tape. There are two main wires 1 and 2, extending from the central or transmitting station. The third conductor employed is the earth itself, or ground connection. This ground connection is indicated at E1 in the drawings. The receiving instrument (see Fig. 2) is controlled through the selector circuit 1 and the type circuit 2. Both circuits carry alternating current with an occasional longer flow in either direction.

The selector circuit rotates the two escapement wheels S5 and S6, each of which carries a brush 54 and 55 in contact with a stationary commutator. A longer flow of current unlocks the wheels. When unlocked, each flow of current in one direction rotates one wheel so its brush moves from one segment to the next of its stationary commutator; each flow of current in the opposite direction rotates the other wheel so its brush moves from segment to segment of its stationary commutator.

The polarized magnet PM9 actuating the platen 61 for each stock tape is connected in a local circuit between a segment of one stationary commutator and a segment of the other; the brushes are connected to opposite terminals of a battery BT. Thus when the switch W6 is closed, a printing platen is going to print upon its tape, and it depends upon what two commutator segments are in contact with the brushes, as to which tape is printed upon.

Figure 2:
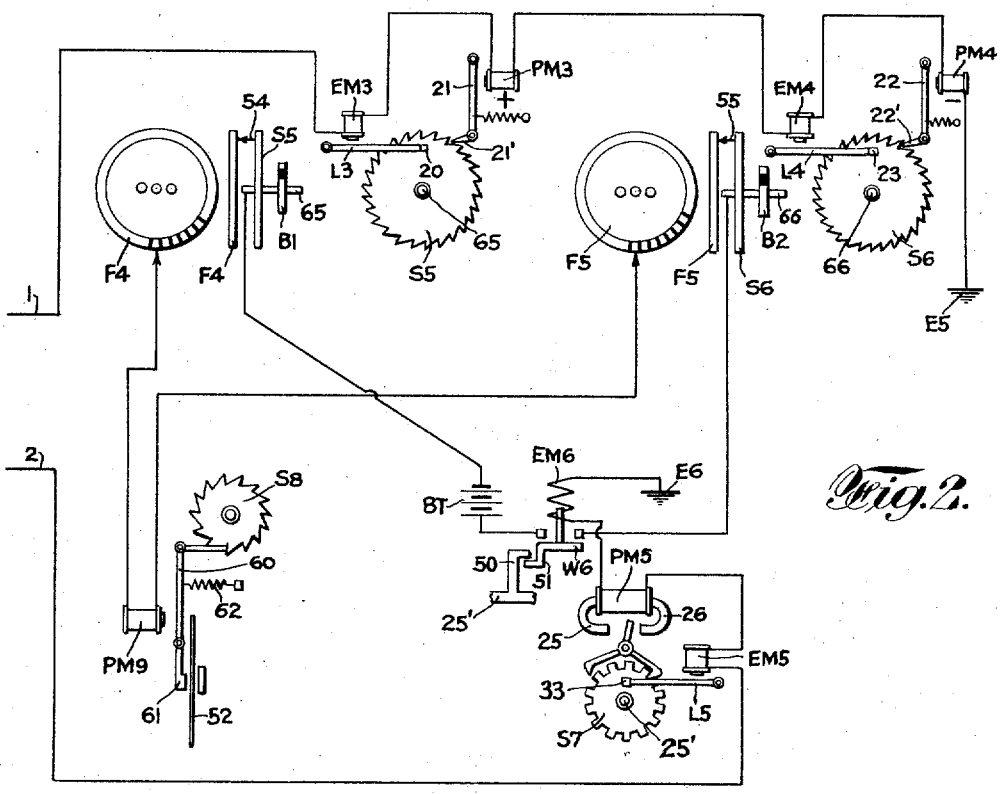
Fig. 2 is a diagramatic view showing a portion of the electrical circuit for operating the receiving mechanism with the essential instruments of the receiving mechanism shown diagrammatically.
Figure 6:
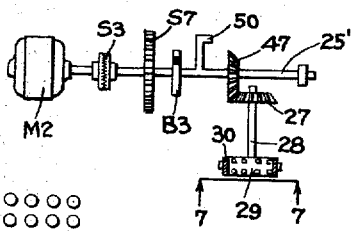
Fig. 6 is a top plan view of a portion of the tape actuating mechanism with a part of the type chain in section.
Figure 7:
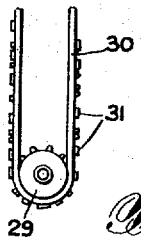
Fig. 7 is a view along the line 7—7 of Fig. 6, illustrating the type of chain.

The type circuit, through an escapement wheel S7 and shafts, controls the movements of the type chain (see Figs. 6, 7 and 2). A longer flow of current unlocks the escapement wheel. Alternating current allows the type chain to move step by step until the desired character is opposite the desired tape. Then a longer flow of current throws the switch W6, and the character is printed upon the tape.

The transmitting apparatus is so arranged as to send the required pulses of current over the two main circuits. From generators D1 and D2 (see Fig. 1), current is sent alternately in opposite directions, through the revolving commutator A1, over the main selector circuit. The commutator may be locked against rotation to allow a longer flow of current. When the desired number of pulses of current has been sent from either generator, a switch is automatically opened to prevent further flow of current from this generator.

In a similar way, current is sent from D1 and D2 through A2 over the type circuit. Polarized magnet PM8 can stop A2 through escapement wheel S2 to allow a longer flow of current. A2 revolves until brush 9 on the left brush wheel F comes into contact with the segment of the stationary commutator F1, which is connected with a depressed type key TK. Then A2 is stopped, and the character represented by the TK key is printed upon the tape represented by, say, the key SK. If it is desired to print this same character upon the next lower tape, then A2 and the type chain would have to revolve one more notch. This additional rotation is provided for by connecting the SK key, representing the next tape in circuit with the second brush wheel F, whose brush 9 is one notch behind the brush for the first wheel. The third tape's SK key would be connected to the third brush wheel to allow for one additional notch of rotation. In tracing the circuit and the relation of the several elements of the transmitting instruments to one another, I shall describe the operation of the mechanism from the first step in energizing the circuits to the final of the series of impulses which completes a cycle in the operation of the transmitting apparatus.

The operator first starts the motor M1 which is preferably an electric motor deriving current from a source 3. The operation of the motor M1 rotates shafts 4 and 5 by means of friction belts 6.

The shafts 4 and 5 are connected with shafts 4′ and 5′ respectively, through friction clutches C1 and C2 respectively, so that if the shafts 4′ and 5′ are not locked by some extraneous means they will rotate. The shaft 4′ carries a commutator A1 thereupon having alternating segments insulated from one another, and each so disposed as to extend over two-thirds of the width of the commutator from alternate sides. An escapement wheel S1 is also fixed to the shaft 4′ so as to turn therewith. This escapement wheel S1 serves to stop or permit rotation of the shaft 4′, depending upon the position of its locking means.

The shaft 5′ carries a commutator A2 similar to the commutator A1 thereupon, and an escapement wheel S2 similar to the escapement wheel S1.

Twenty-six brush wheels F are carried by the shaft 5′ at the outermost end thereof. Each of the brush wheels F has electrically connected thereto a brush 9, extending laterally from the wheel and having their ends in a common plane. The brush wheels F are insulated from one another and have contact surfaces on the peripheral edges thereof.

Under normal conditions, upon actuation of the motor M1 the escapement wheel S2 will be prevented from rotation, and consequently the shaft 5′ by means of an electrical lock mechanism generally indicated at L, which consists in a pivotal lever which lies in the path of the laterally extending lug 10 carried by the wheel S2.

The next step in the operation is that of closing the double pole single throw switch W1. The closing of the switch W1 permits current to flow from the direct current generators D1 and D2, through four circuits as follows:

Circuit No. 1: ground E1, generator D1, switch W1, switch W2, commutator A1, magnet EM1, polarized magnet PM1, magnet EM2, polarized magnet PM2, main line 1;

Circuit No. 2: ground E1, generator D2, switch W1, switch W3, commutator A1, magnet EM1, polarized magnet PM1, magnet EM2, polarized magnet PM2, main line 1;

Circuit No. 3: ground E1, generator D1, switch W1, commutator A2, main line 2;

Circuit No. 4: ground E1, generator D2, switch W1, commutator A2, main line 2.

It should be noted that the elements PM1 and PM2 are polarized magnets, and PM1 becomes effectively energized only when current from the generator D2 is passing through the circuit of which PM1 is a part, and that the element PM2 is a polarized magnet which becomes effectively energized only when current from the generator D1 is passing through the circuit of which PM2 is a part.

It should be further noted that current will flow through the above circuits at that time which the commutators A1 or A2 are properly set to conduct current therethrough from the three conducting wires, two of which form a part of each of the circuits.

Circuit No. 1 carries current from the generator D1 which flows only when the switches W1 and W2 are closed, and the two brushes forming a part of the circuit are on the same segment of the commutator A1.

Circuit No. 2 carries current from the generator D2 which flows only when the switches W1 and W3 are closed, and the two brushes forming a part of that circuit are on the same segment of the commutator A1.

The switches W2 and W3 are normally closed and are opened by the actuation of solenoids hereinafter described.

From A1 to line 1, circuits No. 1 and 2 flow over the same conductor. The current in circuits No. 1 and 2 flows alternately over this conductor, because the segments of the commutator A1 alternate. The rate of rotation of the commutator A1 and the thickness of its segments are arranged so that only enough current will flow in the circuits to cause the polarized electromagnet PM1 and PM2 to pull their pivotally mounted armatures 11 and 12 respectively toward the core of the magnets. As described, PM1 is constructed so that current from the generator D2 will cause it to attract its armature, and PM2 is constructed so that current only from the generator D1 will attract its armature.

A pawl 11′ is associated with the armature 11, which serves to rotate an escapement wheel S3 upon deenergization of the magnet PM1, i. e., when the escapement wheel S3 is not locked by the locking lever armature L1. This lever armature normally lies in the path of a laterally extending lug 14 carried by the escapement wheel S3. When the electromagnet EM1 is energized, the arm lever L1 is drawn upwardly out of the path of the lug 14 and the escapement wheel is free to rotate. S3 is normally locked in this manner. The armature 12 has a pawl 12′ carried thereby which is in engagement with an escapement wheel S4 identical in construction with the escapement wheel S3 and having a laterally extending lug 15 similar to the lug 14 of the wheel S3. A lever armature L2 is normally in the path of the lug 15 and thus serves to stop rotation of the escapement wheel S4. When the magnet EM2 is energized, however, the lever armature is drawn upwardly and the escapement wheel is free to rotate. The escapement wheel S4 is normally locked against rotation. Referring now to Fig. 2, I have shown a portion of the receiving instruments in the electrical circuit employed therein. The receiving instruments consist in an electromagnet EM3, a lever armature L3, similar in construction and function to the armatures L1 and L2, an escapement wheel S5, having a laterally extending lug 20 for engaging with the lever armature L3 when not actuated by its magnet coil, a polarized magnet PM3, a pivotally mounted armature 21 for the magnet PM3, and a pawl 21′ carried by the armature 21 for actuating the escapement wheel S5.

The receiving instrument further consists in an electromagnet EM4, a lever armature L4, and a polarized magnet PM4, an escapement wheel S6, an armature 22 for the magnet PM4, and a pawl 22′, carried by the armature 22. The escapement wheel S6 also carries a laterally extending lug 23 for engaging with the lever arm L4. These members are each identical in construction with that portion of the receiving circuit just described, with the exception that the polarized magnet PM4 is arranged to actuate only when current is flowing from the generator D1 therethrough, while the magnet PM3 is constructed to operate only when current is flowing from the generator D2.

E5 in Fig. 2 represents the ground connection. The magnets PM4, EM4, PM3, and EM3 are all connected in series respectively. The free terminal of the magnet PM4 is connected with the ground E5, while the free terminal of the magnet EM3 is connected through a suitable line connection with the terminal 1 of the transmitting circuit. S5 and S6 are normally locked by virtue of the armature levers L3 and L4 respectively. The portion of the receiving circuit I have just described is known as the selector circuit. This is one of the two principal parts of the receiving circuit.

The other principal part is known as the type circuit and consists chiefly in an electromagnet EM5, an electromagnet PM5 having a substantially horseshoe core with a polarized armature 24 which is permitted to oscillate between the opposite poles 25 and 26 of the magnet PM5, a solenoid EM6 used for the purpose of operating a switch plunger and a ground connection E6. An escapement wheel S7 is driven by means of a motor M2 through a friction clutch C3. Movement of the escapement wheel occurs only by an actuation of the armature 24, and therefore by energization of the polarized magnet PM5.

The shaft 25′ upon which an escapement wheel S7 is mounted also carries a bevel gear 47 which is in mesh with a bevel gear 27 disposed upon a shaft 28 carrying a sprocket wheel 29, (see Fig. 6). An endless type chain 30 is arranged to pass over the sprocket wheel 29 and to be driven thereby. The chain 30 has type characters 31 set on the outer wall thereof, representing the twenty-six letters of the alphabet and other useful symbols. The operation of the type chain will be described more fully at a later time.

The escapement wheel S7 is normally locked by means of a lever armature L5 resting against a lug 33 on the escapement wheel S7 similar to the lever armature L3 associated with the escapement wheel S5 and the lever L4 associated with the lever S6. The magnet EM5 when energized, moves the lever L5 out of engagement with the lug 33 and permits the actuation of the wheel S7 by the motor M2 when the armature 24 is operated.

Returning now to the transmitting circuit, (see Fig. 1) the circuit referred to is No. 3, which includes the dynamo D1, and will have current flowing therethrough only when the switch W1 is closed, and the two brushes forming a part of the circuit are on the same segment of the commutator A2.

The circuit referred to as No. 4, and including the dynamo D2 will have current flowing therethrough only when the switch W1 is closed and the two brushes forming a part of the circuit are on the same segment of the commutator A2. However, under normal conditions the escapement S2 is locked by the lever armature L and this stops rotation of the commutator A2 so that none of the brushes associated therewith and forming a part of the circuits 3 and 4 are on its segments. The rate of rotation of the commutator A2 is regulated the same as that of A1.

Figure 8:
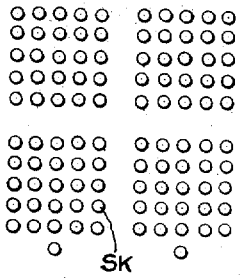
Fig. 8 shows a portion of a selector key board.

The next step in the operation of my improved device for indicating market quotations is that of pressing one of the selector keys, let us say the selector key labeled U. S. Steel. Counting from the left, the first vertical row of keys, Fig. 8, are all connected through the same circuit No. 8, traced later, with the first segment of F3, counting from the locked position of brush 43. The second row of keys is in circuit with the second segment of F3, the third row with the third segment, etc.

Counting from the top, the first horizontal row of keys are all connected through the same circuit No. 7, traced later, with the first segment of F2, counting from the locked position of brush 40. The second row of keys is in circuit with the second segment, the third with the third segment, etc.

It will be obvious that the keyboard could be changed so there would be one key for each segment of F3 and one for each segment of F2, but in this case two keys would have to be depressed, one to control F3 and one to control F2, instead of one as in the case shown. For the purpose of illustration we will assume that the selector key marked SK in Fig. 1 is that key. When any key on the selector keyboard, of which there are just as many as there are strips on the display board hereinafter described, is pressed, it is locked against further movement by means of a notched portion 35 therein which engages with the sliding spring pressed lock plate 36. When the lock plate 36 is moved to the left as shown in Fig. 1, the key may be released. Pressing any of the keys on the selector keyboard of which SK is one, current is permitted to flow through the four different circuits as follows:

Circuit No. 5: generator D3, selector key SK, escapement wheel S3, armature L1, magnet EM7, generator D3;

Circuit No. 6: generator D3, selector key SK, escapement wheel S4, armature L2; magnet EM8, generator D3;

Circuit No. 7: generator D3, selector key SK, stationary commutator F2, escapement wheel S3, polarized magnet PM6, magnet EM9, generator D3;

Circuit No. 8: generator D3, selector key SK, stationary commutator F3, escapement wheel S4, polarized magnet PM7, magnet EM10, generator D3.

PM7 and EM8, PM6, EM7, EM9, and EM10 are solenoid magnets. PM6 and PM7 are polarized electromagnets and operate only when current is flowing in one direction therethrough. These solenoids are employed for the purpose of lifting plungers associated therewith upon which a switch blade is mounted.

Circuit No. 5 carries current from the generator D3, which flows only when S3 is locked by L1, and an SK key is pressed. This current causes electromagnet EM7 through its associate lever armature 36 to stop rotation of the escapement wheel S1 at such a point that the commutator A1 which is carried by the same shaft as the escapement wheel, is in a position to allow current to flow from the generator D2 through the circuit No. 2, heretofore described. Current flows through the circuit No. 2 until electromagnet EM1 pulls the lever armature L1 and unlocks the escapement wheel S3. This breaks circuit No. 5 at L1 and thus releases S1. When the electromagnet EM1 pulls the lever armature L1, electromagnet EM2 should pull the lever armature L2 and unlock the escapement wheels S4.

Circuit No. 6 carries current from the generator D3 which flows only when the escapement wheel S4 is locked by the lever armature L2 and an SK key is pressed. This current causes electromagnet EM8 through its associated lever armature 37, to stop rotation of the escapement wheel S1 at such a point that the commutator A1 is in a position to allow current from the generator D1 to flow through circuit No. 1. Current flows through the circuit No. 1 until the electromagnet EM2 pulls the lever armature L2 and unlocks the escapement wheel S4. This breaks circuit No. 6 at L2 and thus releases S1. When the electromagnet EM2 pulls the lever armature L2, the electromagnet EM1 should pull lever armature L1 and unlock the escapement wheel S3.

This double provision for unlocking the escapement wheels S3 and S4 is made because frequently one will be locked when the other is not, and current cannot flow through one lock to unlock the other, which is locked.

The flow of current that must pass through circuits Nos. 1 and 2 to unlock the escapement wheels S3 and S4 passes on to the selector circuit heretofore described of the receiving instruments. This current unlocks the escapement wheel S5 by operation of the electromagnets EM3 and L3 and unlocks the escapement wheel S6 through the electromagnet EM4 and the lever armature L4. In this manner the escapement wheels S3 and S5 are unlocked so that they can rotate in unison with each impulse or momentary flow of current from the generator D2. The escapement wheels S4 and S6 are unlocked so that they may rotate in unison with each impulse or momentary flow of current from the generator D1.

Circuit No. 7 carries current from the generator D3 which flows only when one of the SK keys is pressed, and a brush 40 in this circuit carried by the escapement wheel S3 is on one of the segments 42 of a stationary commutator F2, which segment is connected with the key SK which is pressed. There is one segment for each horizontal row of SK keys. Let us assume that the U. S. Steel key SK is in the ninth horizontal row, from the top. In the present installation, we will assume that each horizontal row of the keys is connected with a segment of the commutator F2, there being twenty segments and twenty rows.

When the escapement wheel S3 rotates from a locked position to the ninth segment of the stationary commutator F2, current will flow through the circuit No. 7. This current will cause the polarized magnet PM6 to open the switch W3 and also cause the electromagnet EM9 to close a switch W4.

The switch W4 is normally open. Upon opening the switch W3, circuit No. 2 is broken and thus stops the momentary pulsating flow of current from the generator D2 in this circuit. This stops rotation of the escapement wheels S3 and S5 upon the ninth segment of the stationary commutator F2, and of the stationary commutator F4, similar in construction to the commutator F5 of the receiving instrument.

Circuit No. 8 carries current from the generator D3 only when an SK key is pressed, and the brush 43 forming a part of that circuit is upon the segment of a stationary commutator F3, similar to the commutator F2, which is connected with the key SK that is depressed. The key for U. S. Steel which we shall assume is pressed, and which is shown in Fig. 1, is in the fifth vertical row from the left side. Each vertical row of keys is connected with a segment of the stationary commutator F3, there being twenty segments and twenty vertical rows. When the escapement wheel S4 rotates from a locked position to the fifth segment of the stationary commutator F3, current may flow through circuit No. 8. This current causes the polarized magnet PM7 to open the switch W2 and also causes the electromagnet EM10 to close a switch W5 similar to the switch W4. The switch W5 is normally open.

Opening of the switch W2 breaks circuit No. 1 and thus stops the pulsating current from the generator D1 in the circuit. This stops the escapement wheels S4 and S6 respectively upon the fifth segments of their associate stationary commutators F3 and F5, (see Fig. 2). F5 is a commutator similar in construction to the commutator F4.

The selector parts of the sending instrument and the receiving instrument are now in a position for printing upon the tape for U. S. Steel, common.

Figure 3:
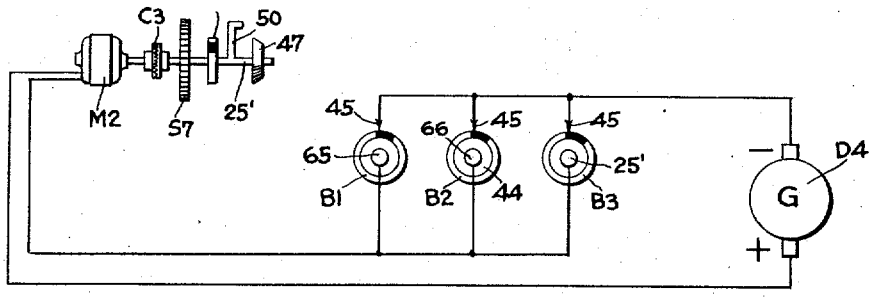
Fig. 3 is a diagrammatic view showing the electrical connections of a portion of the receiving mechanism associated with the moving tapes, and essential instruments of the mechanism shown diagrammatically.

Referring to the receiving instrument, it will be noted that in Fig. 3 I have shown three conductor bands, B1, B2, and B3, which are mounted upon the same shafts with the escapement wheels S5, S6, and S7 respectively, see Figs. 2 and 3. These conductor bands, which form a part of a motor circuit extend substantially 300° upon the peripheral wall of drum-shaped members 44. The remaining 60° of the peripheral wall is of insulating material, so that brushes 45, which are arranged to bear upon the peripheral wall, will contact with the band for 300° and will bear upon insulation during the remaining 60° during rotation of the bands. Current for the motor circuit is provided in a generator D4. This circuit consists in an electromotor M2 and three bands B1, B2, and B3 in parallel, so that rotation of any one of the bands B1, B2, or B3 to contact with their associated brushes 45 will close the circuit and cause rotation of the motor M2.

The bands B1, B2, and B3 are so mounted with respect to their associated escapement wheels S5, S6, and S7, as to lie with the insulation thereof in engagement with their associate brushes when the escapement wheels are locked by their lever armatures L3, L4 and L5 respectively. When either S5 or S6 is unlocked, as explained above, and starts rotating, current flows from D4 through B1 or B2 and rotates the motor M2. The friction clutch C3 is disposed between the motor M2 and the escapement wheel S7, which is mounted upon the shaft 47. The clutch C3 permits the motor M2 to rotate without turning the shaft 25′. The escapement wheel S7 is usually locked and thus prevents rotation of the tape through the gears 47 and 27 (see Fig. 6) until it is unlocked, as explained later. When both S5 and S6 have returned to locked positions, current for M2 cannot flow through B1 or B2. It will be observed that B3 is placed upon the shaft 25 with its insulation opposite the locked position of S7 so current can flow through it until S7 returns to its locked position.

The next step in the operation of my improved device for indicating market quotations is that of pressing one of the type keys on the type keyboard, three of which are shown and labeled TK in Fig. 1. When any key on a type keyboard is pressed, it is locked and remains pressed until after the printing mechanism hereinafter described is operated, by any well known locking device.

Pressing any key on the type keyboard allows current to flow through two circuits as follows:

Circuit No. 9: ground E1, generator D2, switch W1, type key TK, escapement wheel S2, armature L, magnet EM11, main line 2;

Circuit No. 10: generator D3, selector key SK, brush wheel F, stationary commutator F1, type key TK, magnet EM12, polarized magnet PM8, switch W5, switch W4, generator D3.

Circuit No. 9 carries current from the generator D2 which flows only when a TK key is pressed, the switch W1 is closed, and the escapement wheel S2 locked by its lever armature L. This current causes the electromagnet EM11 to pull the lever armature L and thus unlock the escapement wheel S2. This stops the flow of current in circuit No. 9. The flow of current in circuit No. 9 is transmitted through the type line or line 2 to the type circuit of the receiving instruments, where it causes the electromagnet EM5 to pull the lever armature L5 and thus unlock the escapement wheel S7.

The electromagnet EM6 cannot close the switch W6 because of the radially extending stop member 50, carried by the shaft 25′ which engages with a depending hook-shaped member 51 associated with the switch blade W6. In this way the escapement wheels S2 and S7 are unlocked and start rotating in unison, current flowing in circuit No. 3, and circuit No. 4 alternately by virture of the rotation of the commutator A2.

Circuit No. 10 carries current from the dynamo D3 which flows only when an SK key and a TK key are pressed, and F1 has rotated so that the conductor from the pressed SK key is connected through F1 with a conductor to the pressed TK key, and switches W4 and W5 are closed.

Figure 4:
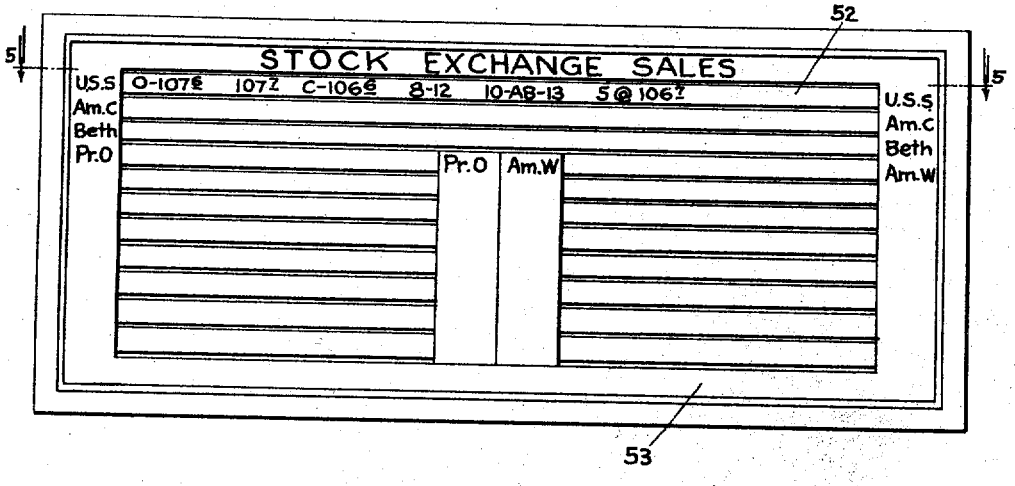
Fig. 4 is a front elevation of a stationary display board with the moving tapes in position.

With reference to Fig. 4, it will be noted that the U. S. Steel tape is at the top of the board and that tapes for various other stocks are disposed in horizontal rows across the board. The U. S. Steel tape is indicated at 52 of the board 53.

Figure 5:
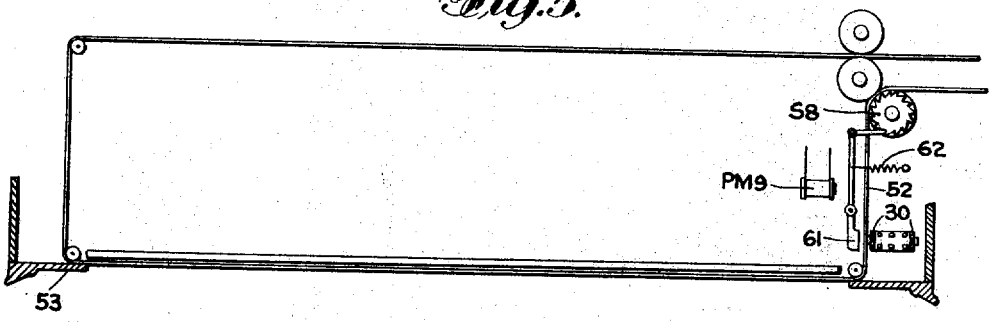
Fig. 5 is a sectional view along the line 5—5 of Fig. 4.

When the escapement wheel S7 is locked, the character 1 of the type chain 30 is opposite U. S. Steel tape, (see Fig. 5). There are twenty-six characters and spaces upon the type chain 30 so that if S7 rotates twenty-two notches, i. e., so as to cause the type chain 30 to move twenty-two characters, the character 5 will be opposite U. S. Steel, and current can also flow through circuit 10.

If it were desired to print "5" upon the American Can tape, which is below the U. S. Steel tape, the escapement wheel 7 would have to rotate twenty-three notches. All tapes in the same relative positions to the characters upon the type chain 30, as U. S. Steel is to the type chain, are in position 1, and their SK keys are connected with the same brush on F1.

The American Can tape is in the second position and its SK key is connected to the second brush on F1. The flow of current in the circuit 10 causes the polarized magnet PM8 to pull its armature and stop the escapement wheel S2. The escapement wheel S2 stops so that the commutator A2 allows a longer flow of current over the circuits 3 or 4, depending upon the position of the commutator A2. This current is conducted to the type circuit through the line 2 and the ground, and causes electromagnets EM6 to close the switch W6 in the local circuit.

This local circuit consists in the following:

Battery BT, switch W6, escapement wheel S6, stationary commutator F5, polarized magnet PM9, stationary commutator F4, escapement wheel S5, battery BT.

Current in the local circuit flows only when the switch W6 is closed and the brushes 54 and 55 of the escapement wheels S5 and S6 respectively are upon the conductor segments of their stationary conductors F4 and F5 respectively. The flow of current in the local circuit causes the polarized magnet PM9 for U. S. Steel to attract its armature 60 upon which a platen 61 is mounted to print 5 upon the U. S. Steel tape 52.

When PM9 releases its armature 60, the spring 62 rotates the roller S8 one space, so that the tape is ready for the next character to be printed.

There is a polarized magnet PM9 for each tape upon the board. These magnets are all connected in parallel in the local circuit between F5 and F4. They are connected in such a way that between any one segment of F5 and any one segment of F4 there is only one magnet PM9. Thus the combination in the local circuit of any particular segment of F5 and any particular segment of F4 determines the tape to be printed upon.

Circuit No. 10 causes EM12 to attract its armature 64, thus releasing TK key 5. This shows to the transmitting operator that 5 has been printed upon the U. S. Steel tape.

When the operator presses TK keys @, 1, 0, 6, 7 and space, one after the other is released. These characters are printed upon the tape in the same manner that the character "5" is printed.

If no further keys are pressed, the escapement wheels S2 and S7 rotate to locked position.

The next operation is that of pressing the release strap 36 of the selector keyboard.

The release strap releases U. S. Steel key SK which breaks circuits 5, 6, 7, 8, and 10. Breaking circuits 7 and 8 allows switches W3 and W2 to close, and W4 and W5 to open. Closing switches W3 and W2 allows current to flow through circuits 1 and 2. This permits the whole system to go back to its normal position. The operator next opens switch W1 and then stops the motor M1.

I claim:

1. In a device for indicating market quotations, a transmitting station, a remote receiving station, a selector keyboard at said transmitting station, a plurality of tapes at said receiving station, a selector mechanism comprising selector elements at the transmitting and at the receiving station, means for actuating said selector elements to operate in synchronism, said last named means being actuated by the depression of a key on the selector keyboard, whereby one of the tapes at the receiving station is selected, a printing mechanism at the receiving station for printing a selected tape, and a type selecting keyboard at said transmitting station for selecting the type and for actuating the printing mechanism.

2. In a device for indicating market quotations, a transmitting station, a remote receiving station, a selector keyboard at said transmitting station, a plurality of tapes at said receiving station, a selector mechanism comprising normally locked selector elements at the transmitting and at the receiving station, means for unlocking and advancing said selector elements to operate in synchronism, said last named means being actuated by the depression of a key on the selector keyboard, whereby one of the tapes at the receiving station is selected, a printing mechanism at the receiving station for printing a selected tape, and a type selecting keyboard at said transmitting station for selecting the type and for actuating the printing mechanism.

3. In a device for indicating market quotations, a transmitting station, a remote receiving station, a selector keyboard at said transmitting station, a plurality of tapes at said receiving station, a selector mechanism comprising normally locked selector elements at the transmitting and at the receiving station, means for unlocking, advancing and stopping said selector elements to operate in synchronism, said last named means being actuated by the depression of a key on the selector keyboard, whereby one of the tapes at the receiving station is selected, a printing mechanism at the receiving station for printing a selected tape, and a type selecting keyboard at said transmitting station for selecting the type and for actuating the printing mechanism.

4. In an apparatus for indicating market quotations, a transmitting mechanism, a receiving mechanism, said receiving mechanism including a plurality of stock selecting magnets, a pair of complementary selectors for selectively preparing circuits for said magnets, means responsive to concurrent positive and negative impulses for respectively operating the members of said pair of selectors concurrently to different or like extents, each selecting device including a brush and a plurality of cooperating segments connected to the terminals of said magnets, means connecting said brushes to the terminals of a source of electrical energy, and means in the transmitting mechanism for transmitting positive and negative impulses concurrently over a single line wire to the operating means for the selectors.

5. In an apparatus for indicating market quotations, a transmitting mechanism, a receiving mechanism, said receiving mechanism including a plurality of stock selecting magnets, a pair of complementary selectors for selectively preparing circuits for said magnets, means responsive to concurrent positive and negative impulses for respectively operating the members of said pair of selectors concurrently to different or like extents, each selecting device including a brush and a plurality of cooperating segments connected to the terminals of said magnets, means connecting said brushes to the terminals of a source of electrical energy, means in the transmitting mechanism for transmitting positive and negative impulses concurrently over a single line wire to the operating means for the selectors, and means also in the transmitting mechanism for operating said connecting means.

6. In an apparatus of the character described, the combination of a transmitting mechanism including stock selection keys, means for concurrently transmitting series of positive and negative impulses under control of said keys over a single line wire, a plurality of digit keys, means for transmitting concurrent series of positive and negative impulses under conjoint control of said digit keys and stock selection keys over a single line wire, a receiving mechanism including, a plurality of printing magnets, electrical means responsive to positive and negative impulses transmitted under control of the stock selection keys for selectively preparing circuits to any of said magnets, a tape for each stock, a type carrier, means responsive to positive and negative impulses transmitted under control of the digit keys and the stock selection keys for adjusting said type carrier to bring any desired character into printing position with any desired tape, and means operated automatically in response to a distinctive impulse sent by the transmitting mechanism after said type has been set for completing the selectively prepared circuit through a printing magnet.

7. In an apparatus of the character described, the combination of a transmitting mechanism including stock selection keys, means for concurrently transmitting series of positive and negative impulses under control of said keys over a single line wire, a plurality of digit keys, means for concurrently transmitting series of positive and negative impulses under conjoint control of said selection keys and said digit keys over a single line wire, means automatically controlling the subsequent transmission of a long impulse over a single wire, a receiving mechanism including a plurality of stock selecting magnets, electrical means responsive to positive and negative impulses transmitted under control of said selection keys for selectively preparing circuits to any of said magnets, a printing mechanism including an impression hammer for and operated by each of said magnets, a tape for each of said hammers, a common type carrier cooperating with all of said tapes, means under control of positive and negative impulses transmitted under conjoint control of said selection keys and said digit keys for controlling the type carrier to present any desired character opposite any desired tape, and means operated by said long impulse after the type carrier has been controlled for closing the prepared circuit to the magnet operating the impression means associated with the desired tape.

8. The combination of a transmitting mechanism, a receiving mechanism, stock selecting means in the receiving mechanism, a plurality of means also in the receiving mechanism responsive respectively to concurrent positive and negative impulses for selectively controlling the operation of said stock selecting means, stock selecting keys in the transmitting mechanism, and means set in operation upon depression of a stock selecting key for causing the concurrent transmission of positive and negative impulses to effect selection of the stock selecting means corresponding to the key depressed.

9. In an apparatus of the character described, including a transmititng mechanism, a receiving mechanism including a plurality of stock selecting means and a plurality of means responsive to concurrent series of positive and negative impulses for selectively controlling the operation of said stock selecting means, stock selection control keys in the transmitting mechanism, means for concurrently transmitting a plurality of series of positive and negative impulses under control of said keys to said plurality of responsive means in the receiving mechanism, and means operable under control of said keys for opening up circuits over which the positive and negative impulses are respectively transmitted after the required number of positive and negative impulses have been transmitted.

10. The combination of a transmitting mechanism including an item keyboard, a character keyboard, transmission mechanism adapted when set in operation to automatically transmit impulses under control of said keyboards, a receiving mechanism including an electromagnetic device for each item, complementary means responsive to impulses transmitted under control of said item keyboard for selectively controlling the operation of said devices, means bearing indicia corresponding to the keys on the character keyboard, and means responsive to impulses transmitted under control of said character keyboard for adjusting said character bearing means, said electromagnetic device causing the selected indicia to be displayed in a distinctive location on a display board.

11. The combination of a transmitting mechanism and a receiving mechanism, an adjustable type carrier in said receiving mechanism, a plurality of tapes associated with said type carrier, an impression means associated with each tape, means in the receiving mechanism responsive to impulses transmitted by said transmitting mechanism for selectively positioning any desired character on said type carrier opposite any desired tape, and means set in operation automatically after said adjustment has been made, for operating the associated impression means.

12. The combination of a transmitting mechanism and a receiving mechanism, an adjustable type carrier in said receiving mechanism, a plurality of tapes associated with said type carrier, an impression means associated with each tape, means in the receiving mechanism responsive to impulses transmitted by said transmitting mechanism for selectively positioning any desired character on said type carrier opposite any desired tape, means set in operation automatically after said adjustment has been made, for operating the associated impression means, and means set in operation automatically after the impression has been effected for normalizing said type carrier.

13. The combination of a transmitting mechanism and a receiving mechanism, an adjustable type carrier in said receiving mechanism, a plurality of tapes associated with said type carrier, an impression means associated with each tape, means in the receiving mechanism responsive to impulses transmitted by said transmitting mechanism for selectively positioning any desired character on said type carrier opposite any desired tape, means for automatically operating the associated impression means after said adjustment has been made, means for automatically normalizing said type carrier after the impression has been effected, and impression means and type selecting keys controlling said transmitting mechanism to transmit impulses under control of said tape selecting keys to selectively control the operation of said impression means and to transmit impulses under conjoint control of said impression means selecting and type selecting keys to selectively adjust said type carrier to present the desired character opposite the desired tape.

14. The combination of a display board including a plurality of tapes and an impression means associated with each tape, electromagnetically operated means for selecting any impression means for operation, a type carrier, electromagnetic means for controlling the adjustment of said type carrier to present any desired character opposite said selected impression means, a transmission mechanism, a keyboard comprising keys for controlling said transmission mechanism to automatically transmit impulses to control the operation of said first electromagnetically operated means to effect selection of any desired impression means, keys for controlling said transmission mechanism to automatically transmit impulses to control the operation of said second electromagnetic means to effect selection of any desired type character on said type carrier, and means operable under conjoint control of said sets of keyboards for controlling said transmission mechanism to automatically transmit impulses to said second electromagnetic means to cause said desired type character to be positioned opposite to said selected impression means.

15. In a receiving apparatus of the character described comprising a display board including a plurality of tapes, type carrying means, an impression means associated with each tape, a transmission mechanism located at a distant point, and means in the receiving apparatus responsive to impulses transmitted by said transmission mechanism for selectively positioning any type character on said type carrying means successively opposite a plurality of said tapes and for selectively operating any one of the associated impression means.

16. The combination of a display board including a plurality of tapes, a single type carrier adjustable to present any one of its characters opposite any one of said tapes, a keyboard comprising a set of keys corresponding to said tapes and a set of keys corresponding to said type characters, a transmission mechanism operable to transmit a continuous series of impulses under conjoint control of said sets of keys, means responsive to said impulses for moving the type carrier to present the type character corresponding to the depressed key of the second set opposite the tape corresponding to the depressed key of the first set, and means for automatically effecting an impression from said type character on said tape after adjustment of said type carrier has been completed.

17. The combination of a plurality of tapes for receiving printed impressions, a type carrier cooperating with said tapes, a set of keys corresponding to said type, a set of keys corresponding to said tapes, electromagnetic means for adjusting said type carrier, and transmission means under control of said sets of keys for sending a continuous series of impulses to operate said electromagnetic means to move said carrier by an uninterrupted series of movements directly from a normal position to the position in which the desired type cooperates with the desired tape.

18. The combination of a plurality of tapes for receiving printed impressions, a type carrier cooperating with said tapes, a set of keys corresponding to said tapes, a set of keys corresponding to the type on said type carrier, means for transmitting current impulses to adjust said type, and a circuit made by a key in one set and a key in the other set for controlling the current impulses transmitted by said transmission means to position any desired type opposite to any desired tape.

19. The combination of a plurality of tapes for receiving printed impressions, a type carrier cooperating with said tapes, a set of keys corresponding to said tapes, a set of keys corresponding to the type on said type carrier, means for transmitting current impulses to adjust said type, a circuit made by a key in one set and a key in the other set for controlling the current impulses transmitted by said transmission means to position any desired type opposite to any desired tape, and means for automatically effecting an impression from said type on said tape.

20. The combination of a plurality of tapes for receiving printed impressions, a type carrier cooperating with said tapes, a set of keys corresponding to said tapes, a set of keys corresponding to the type on said type carrier, means for transmitting current impulses to adjust said type, a circuit made by a key in one set and a key in the other set for controlling the current impulses transmitted by said transmission means to position any desired type opposite to any desired tape, means for automatically effecting an impression from said type on said tape, and means for releasing a depressed key in the second set after impression has been effected.

21. The combination of a plurality of tapes for receiving printed impressions, a type carrier cooperating with said tapes, a set of keys corresponding to said tapes, a set of keys corresponding to the type on said type carrier, means for transmitting current impulses to adjust said type, a circuit made by a key in one set and a key in the other set for controlling the current impulses transmitted by said transmission means to position any desired type opposite to any desired tape, means for automatically effecting an impression from said type on said tape, means for releasing a depressed key in the second set after impression has been effected, and means for automatically normalizing said transmission means and said type carrier.

22. The combination of a transmitting mechanism and a plurality of distant receiving mechanisms, each receiving mechanism including a display board for displaying price changes as to a large number of stocks, a plurality of keys for controlling the transmission mechanism to transmit impulses for selectively displaying any price change in any position on said display boards, means in each receiving mechanism responsive to said impulses for causing said price change to be displayed in any desired position on said board, means for maintaining the display of a plurality of the last of successive price changes in said positions, and an electrical connection between said transmitting mechanism and said receiving mechanism over which said impulses are transmitted, said connection comprising a much smaller number of channels than the number of positions on the board and the number of digits in the numerical system employed.

23. The combination of a display board comprising a plurality of tapes, type carrying means associated with said tapes, electromagnetic means responsive to impulses received over a single line channel for adjusting said type carrying means with respect to said tapes, electromagnetically operated impression effecting means associated with each tape, and selecting means associated with said board and responsive to impulses received over a single line channel for selectively activating said impression means.

In testimony whereof I have signed my name to this petition.

EMERY C. FURRER.